US012804691B2

(12) United States Patent
Yuan et al.

(10) Patent No.: US 12,804,691 B2
(45) Date of Patent: Nov. 17, 2026

(54) INDICATING BEAM APPLICABILITY FOR USER EQUIPMENT COOPERATION

(71) Applicant: QUALCOMM Incorporated, San Diego, CA (US)

(72) Inventors: Fang Yuan, Beijing (CN); Aleksandar Damnjanovic, Del Mar, CA (US); Yan Zhou, San Diego, CA (US); Mostafa Khoshnevisan, San Diego, CA (US); Wooseok Nam, San Diego, CA (US); Jing Sun, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/264,727

(22) PCT Filed: Apr. 27, 2021

(86) PCT No.: PCT/CN2021/090126
§ 371 (c)(1),
(2) Date: Aug. 8, 2023

(87) PCT Pub. No.: WO2022/226757
PCT Pub. Date: Nov. 3, 2022

(65) Prior Publication Data
US 2024/0114537 A1 Apr. 4, 2024

(51) Int. Cl.
*H04W 72/51* (2023.01)
*H04W 72/044* (2023.01)

(52) U.S. Cl.
CPC ......... *H04W 72/51* (2023.01); *H04W 72/046* (2013.01)

(58) Field of Classification Search
CPC ... H04W 72/51; H04W 72/046; H04W 88/04; H04B 7/0404; H04B 7/063; H04B 7/0617; H04B 7/026
See application file for complete search history.

(56) References Cited

U.S. PATENT DOCUMENTS

| | | | | |
|---|---|---|---|---|
| 2019/0014570 | A1 | 1/2019 | Nam et al. | |
| 2020/0007292 | A1 * | 1/2020 | Huang | H04B 7/06956 |
| 2020/0044797 | A1 * | 2/2020 | Guo | H04W 72/51 |
| 2020/0245166 | A1 * | 7/2020 | Kwak | H04B 7/0695 |
| 2020/0367299 | A1 * | 11/2020 | Ryu | H04B 7/0695 |
| 2020/0413374 | A1 * | 12/2020 | Luo | H04W 76/14 |
| 2021/0036822 | A1 * | 2/2021 | Lyu | H04L 5/0048 |
| 2021/0067303 | A1 * | 3/2021 | Taherzadeh Boroujeni | H04W 76/14 |
| 2021/0112560 | A1 | 4/2021 | Khoshnevisan et al. | |

(Continued)

OTHER PUBLICATIONS

International Search Report and Written Opinion—PCT/CN2021/090126—ISA/EPO—Oct. 11, 2021.

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a user equipment (UE) may transmit a beam applicability report that indicates beam applicability information corresponding to one or more physical channels for a UE cooperation operation. The UE may communicate with at least one wireless communication device in the UE cooperation operation based at least in part on the beam applicability information. Numerous other aspects are described.

30 Claims, 8 Drawing Sheets

(56) References Cited

U.S. PATENT DOCUMENTS

| | | | | |
|---|---|---|---|---|
| 2021/0119688 | A1* | 4/2021 | Enescu | H04W 52/0229 |
| 2021/0259001 | A1* | 8/2021 | Park | H04W 72/0453 |
| 2021/0410130 | A1* | 12/2021 | Rahman | H04B 7/06964 |
| 2022/0029682 | A1* | 1/2022 | Park | H04B 7/0456 |
| 2022/0116094 | A1* | 4/2022 | Wang | H04B 7/06964 |
| 2022/0201669 | A1* | 6/2022 | Yuan | H04W 72/046 |
| 2022/0330038 | A1* | 10/2022 | Ganesan | H04W 8/005 |
| 2023/0029850 | A1* | 2/2023 | Park | H04W 72/1268 |
| 2023/0071462 | A1* | 3/2023 | Su | H04W 72/0453 |
| 2023/0370227 | A1* | 11/2023 | Liu | H04B 7/0639 |
| 2023/0397015 | A1* | 12/2023 | Liu | H04W 72/1268 |
| 2023/0397197 | A1* | 12/2023 | Liu | H04L 5/0044 |
| 2024/0114537 | A1* | 4/2024 | Yuan | H04W 72/51 |
| 2024/0205990 | A1* | 6/2024 | Yuan | H04W 76/14 |
| 2025/0142601 | A1* | 5/2025 | Yuan | H04W 76/28 |

* cited by examiner

INDICATING BEAM APPLICABILITY FOR USER EQUIPMENT COOPERATION

CROSS-REFERENCE TO RELATED APPLICATION

This Patent Application is a 371 national stage of PCT Application No. PCT/CN2021/090126 filed on Apr. 27, 2021, entitled "INDICATING BEAM APPLICABILITY FOR USER EQUIPMENT COOPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating beam applicability for user equipment cooperation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: transmit a beam applicability report that indicates beam applicability information corresponding to one or more physical channels for a UE cooperation operation; and communicate with at least one wireless communication device in the UE cooperation operation based at least in part on the beam applicability information.

In some aspects, a base station for wireless communication includes a memory, and one or more processors, coupled to the memory, configured to: receive, from a UE, a beam applicability report that indicates beam applicability information corresponding to one or more physical channels for a UE cooperation operation; and communicate with the UE based at least in part on the beam applicability information.

In some aspects, a method of wireless communication performed by a UE includes transmitting a beam applicability report that indicates beam applicability information corresponding to one or more physical channels for a UE cooperation operation; and communicating with at least one wireless communication device in the UE cooperation operation based at least in part on the beam applicability information.

In some aspects, a method of wireless communication performed by a base station includes receiving, from a UE, a beam applicability report that indicates beam applicability information corresponding to one or more physical channels for a UE cooperation operation; and communicating with the UE based at least in part on the beam applicability information.

In some aspects, a non-transitory computer-readable medium storing a set of instructions for wireless communication includes one or more instructions that, when executed by one or more processors of a UE, cause the UE to: transmit a beam applicability report that indicates beam applicability information corresponding to one or more physical channels for a UE cooperation operation; and communicate with at least one wireless communication device in the UE cooperation operation based at least in part on the beam applicability information.

In some aspects, a non-transitory computer-readable medium storing a set of instructions for wireless communication includes one or more instructions that, when executed by one or more processors of a base station, cause the base station to: receive, from a UE, a beam applicability report that indicates beam applicability information corresponding to one or more physical channels for a UE cooperation operation; and communicate with the UE based at least in part on the beam applicability information.

In some aspects, an apparatus for wireless communication includes means for transmitting a beam applicability report that indicates beam applicability information corresponding to one or more physical channels for a UE cooperation operation; and means for communicating with at least one wireless communication device in the UE cooperation operation based at least in part on the beam applicability information.

In some aspects, an apparatus for wireless communication includes means for receiving, from a UE, a beam applicability report that indicates beam applicability information corresponding to one or more physical channels for a UE cooperation operation; and means for communicating with the UE based at least in part on the beam applicability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
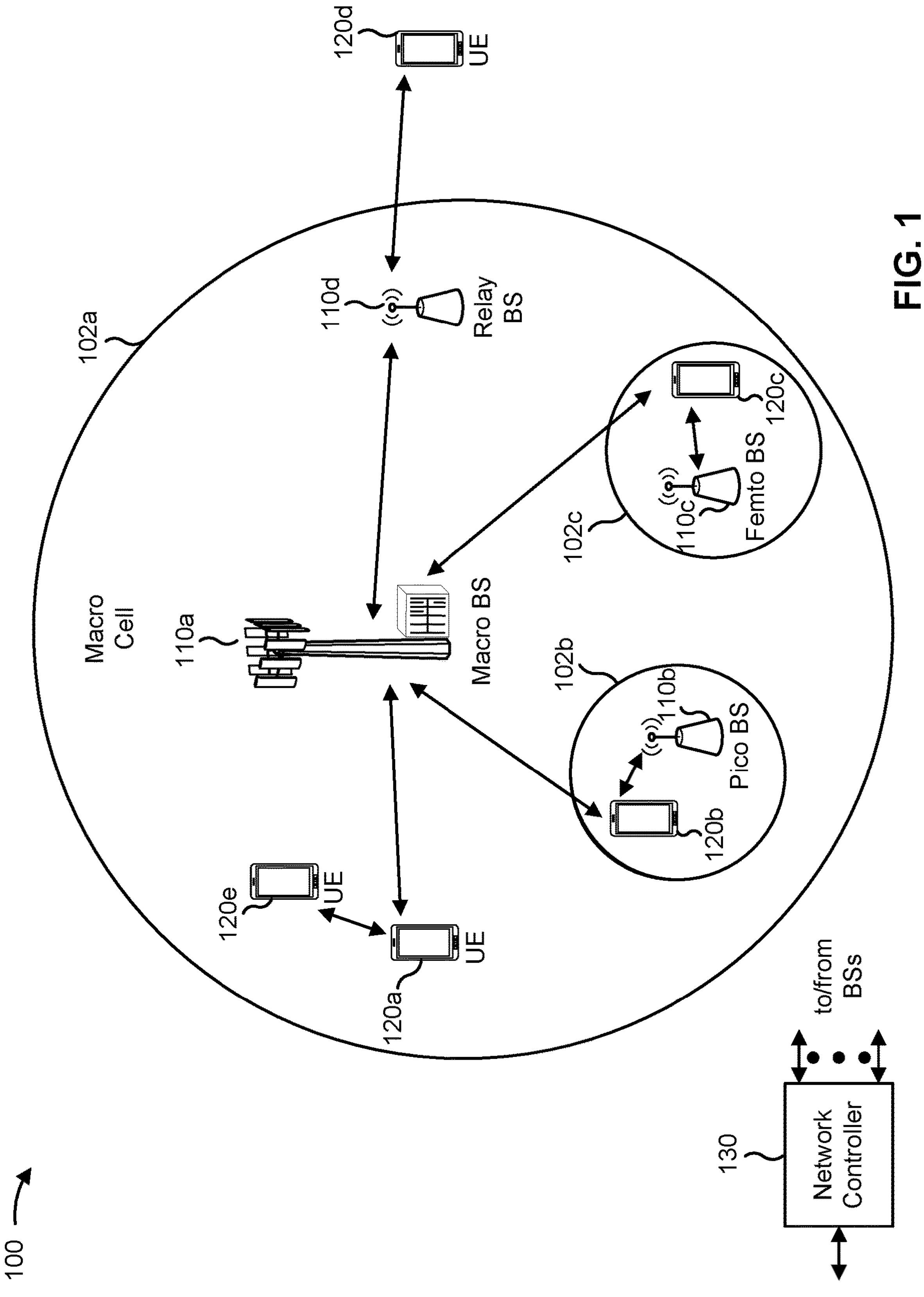
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
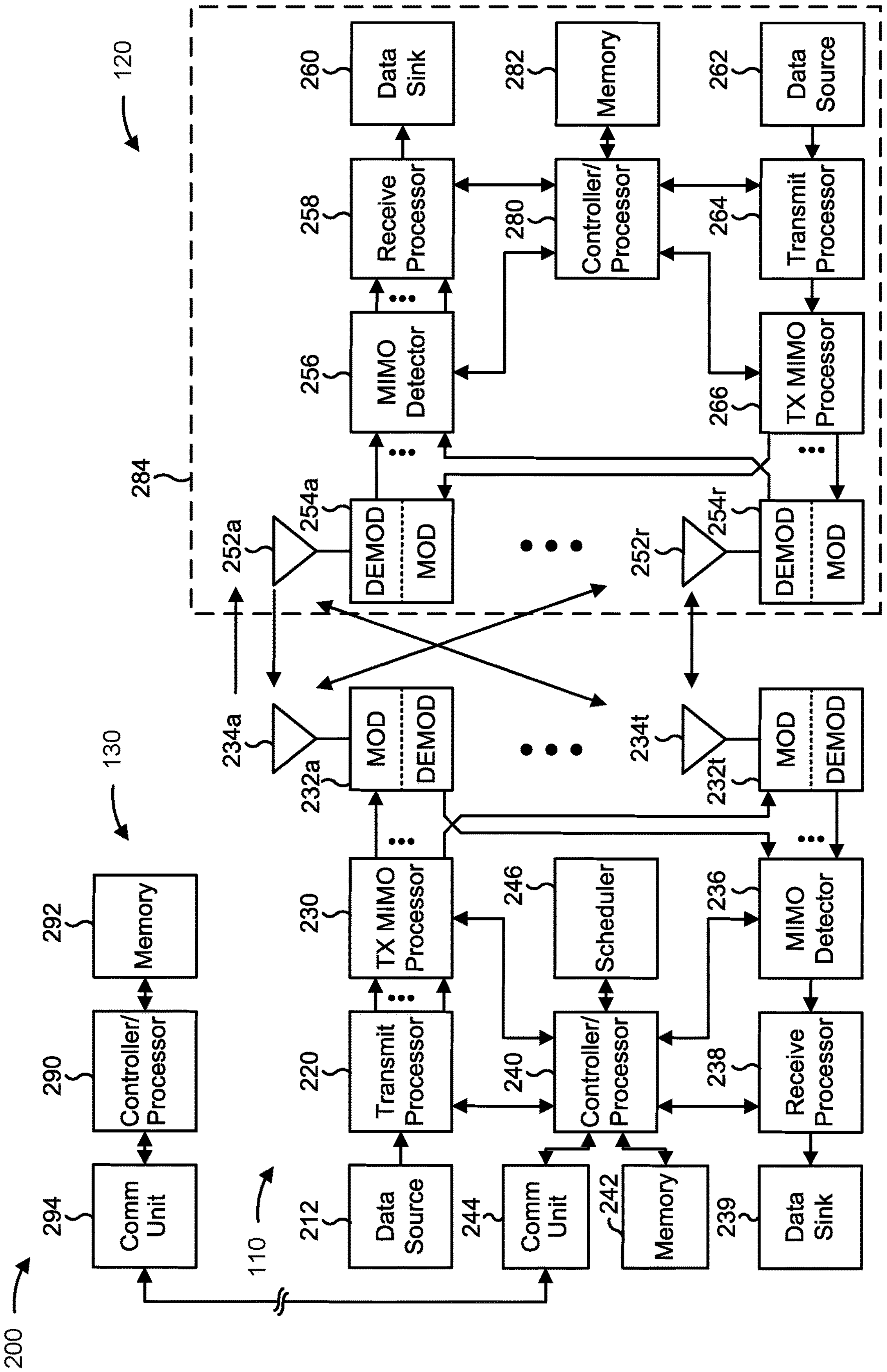
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel (which may be interchangeably referred to as a "panel" herein), an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam or a spatial transmit filter.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with indicating beam applicability for UE cooperation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for transmitting a beam applicability report that indicates beam applicability information corresponding to one or more physical channels for a UE cooperation operation; and/or means for communicating with at least one wireless communication device in the UE cooperation operation based at least in part on the beam applicability information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving, from a UE, a beam applicability report that indicates beam applicability information corresponding to one or more physical channels for a UE cooperation operation; and/or means for communicating with the UE based at least in part on the beam applicability information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
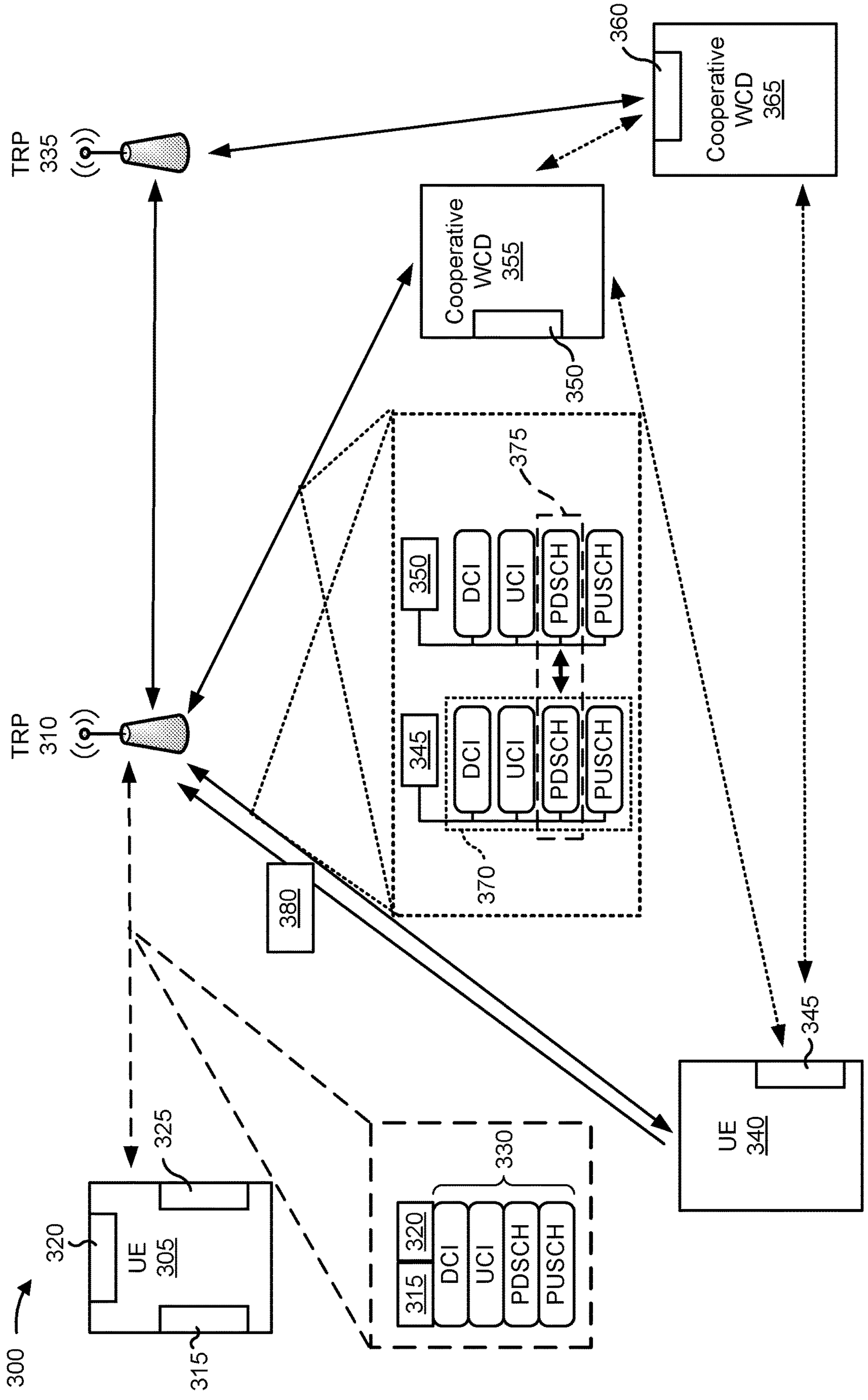
FIG. 3 is a diagram illustrating an example of UE cooperation, in accordance with the present disclosure.

FIG. 3 is a diagram illustrating an example of UE cooperation, in accordance with the present disclosure. As shown, a UE 305 may communicate with a TRP 310. The UE 305 may communicate with the TRP 310 via a wireless communication network. The UE 305 may be, or be similar to, the UE 102 described above in connection with FIGS. 1 and 2.

As shown, the UE 305 may include a first antenna panel 315, a second antenna panel 320, and a third antenna panel 325. In some cases, the UE 305 may include additional antenna panels not illustrated in FIG. 3 or fewer antenna panels than are illustrated in FIG. 3. The TRP 310 may communicate with the UE 305 via the panels 315, 320, and/or 325. For example, the TRP 310 may communicate with the UE via the first panel 315 and the second panel 320.

As shown, a set 330 of processing resources for different types of channels may be shared between the first panel 315 ("P1") and the second panel 320 ("P2"). For example, TCI states applied to a physical downlink control channel (PDCCH) can be selected from a TCI state pool from which TCI states are selected for a physical downlink shared channel (PDSCH). For example, a medium access control (MAC) control element (MAC-CE) may be used to activate a TCI for a control resource set (CORESET), and that TCI may be down-selected from a TCI state pool associated with the PDSCH. In that way, a TCI for a PDCCH and/or a CORESET can also be applicable to the PDSCH.

Similarly, in some cases, the UE 305 may communicate with a second TRP 335 as well as the first TRP 310. Such communication scenarios may be referred to as multiple-TRP (m-TRP) scenarios. In an m-TRP scenario, a TRP 310 and/or a TRP 335 may be a distributed unit (DU) of a distributed radio access network (RAN). In some aspects, a TRP 310 and/or a TRP 335 may correspond to a base station 110 as described above in connection with FIG. 1. For example, different TRPs 310 and/or 335 may be included in different base stations 110. Additionally, or alternatively, multiple TRPs 310 and/or 335 may be included in a single base station 110. In some cases, a TRP 310 and/or a TRP 335 may be referred to as a cell, a panel, an antenna array, or an array.

A TRP 310 and/or a TRP 335 may be connected to a single access node controller or to multiple access node controllers. In some aspects, a dynamic configuration of split logical functions may be present within an architecture of a distributed RAN. For example, a packet data convergence protocol (PDCP) layer, a radio link control (RLC) layer, and/or a MAC layer may be configured to terminate at an access node controller or at a TRP 310 and/or a TRP 335.

In some aspects, multiple TRPs 310 and/or 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different TCI states, different precoding parameters, and/or different beamforming parameters). In some aspects, a TCI state may be used to indicate one or more QCL relationships. A TRP 310 and/or a TRP 335 may be configured to individually (e.g., using dynamic selection) or jointly (e.g., using joint transmission with one or more other TRPs 310 and/or 335) serve traffic to the UE 305.

The multiple TRPs 310 and/or 335 may communicate with the same UE 305 in a coordinated manner (e.g., using coordinated multipoint transmissions) to improve reliability and/or increase throughput. The TRPs 310 and/or 335 may coordinate such communications via an interface between the TRPs 310 and/or 335 (e.g., a backhaul interface and/or an access node controller). The interface may have a smaller delay and/or higher capacity when the TRPs 310 and/or 335 are co-located at the same base station 110 (e.g., when the TRPs 310 and/or 335 are different antenna arrays or panels of the same base station 110), and may have a larger delay and/or lower capacity (as compared to co-location) when the TRPs 310 and/or 335 are located at different base stations 110. The different TRPs 310 and/or 335 may communicate with the UE 305 using different QCL relationships (e.g., different TCI states), different demodulation reference signal (DMRS) ports, and/or different layers (e.g., of a multi-layer communication).

In some aspects, as with communication with the TRP 310 described above, the panels 315, 320, and/or 325 of the UE 305 may share computational and/or communication resources 330. In a single downlink control information (S-DCI) m-TRP scenario, a TCI state may be associated with any TRP and/or panel. For example, in some aspects, a TCI for a PDCCH and/or a corresponding CORESET can also be applicable for any PDSCH associated with any of two panels (e.g., the panel 315 and the panel 320). In some cases, in an S-DCI based m-TRP scenario, a spatial relation indication for a physical uplink shared channel and/or a corresponding sounding reference signal (SRS) can be selected from any downlink channel state information reference signal (CSI-RS) associated with any of two panels (e.g., the panel 315 and the panel 320).

In some cases, a UE may communicate with TRPs 310 and 335 using UE cooperation. In a UE cooperation scenario, at least one wireless communication device separate from the UE may include at least one panel that may be shared with the UE for communication. In this way, rather than communicating using co-located panels, a UE may communicate using distributed panels.

For example, as shown in FIG. 3, a UE 340 may communicate with the TRP 310 and the TRP 335 using a panel 345 of the UE 340, a cooperative panel 350 of a cooperative wireless communication device (WCD) 355, and a cooperative panel 360 of a cooperative WCD 365. In some cases, the UE 340, the cooperative WCD 355 and/or the cooperative WCD 365 may include additional panels not illustrated in FIG. 3. The cooperative WCD 355 and/or the cooperative WCD 365 may include a UE, a vehicle, a UE associated with a vehicle, and/or a customer premises equipment, among other examples. In some aspects, multiple UEs (e.g., the UE 305 and the UE 340) may share the cooperative panel 350 and/or the cooperative panel 360. For example, as shown by solid arrows, the UE 340 may communicate with the TRP 310 using the panel 345, the cooperative WCD 355 may communicate with the TRP 310 using the panel 350, and the cooperative WCD 365 may communicate with the TRP 335 using the panel 360. As shown by dashed arrows, the cooperative WCD 355 may communicate with the UE 340 (e.g., using a sidelink communication) to relay communications between the UE 340 and the TRP 310. Similarly, the cooperative WCD 365 may communicate with the UE 340 to relay communications between the UE 340 and the TRP 335. As is further shown in FIG. 3, the cooperative WCD 355 may communicate with the cooperative WCD 365 to relay communications between the UE 340 and the TRP 310, to relay communications between the UE 340 and the TRP 335, and/or to coordinate cooperative sharing configurations and/or resources, among other examples.

In a UE cooperation operation, beam applicability to a channel may be restricted. For example, as shown in FIG. 3, a first set 370 of processing and/or communication resources may be associated with the panel 345, and a second set 375 of processing and/or communication resources may be shared by the panel 345 and the panel 350. In this case, for example, a single DCI transmission may schedule PDSCH communications corresponding to the UE 340 and the cooperative WCD 355, but only the UE 340 may be responsible for receiving and processing the DCI transmission (since DCI resources are not shared, as shown). A TCI associated with a PDCCH and/or a CORESET may be not applicable for a certain PDSCH reception if the PDCCH and the PDSCH are not associated with the same panel. This lack of shared resources may result in excessive overhead and processing burdens. Moreover, in some cases, as shown, only the UE 340 may be scheduled to transmit a physical uplink shared channel (PUSCH) communication, and a beam associated with a CSI-RS reception may be not applicable for a certain PUSCH reception if the CSI-RS and the PUSCH are not associated with the same panel. This also may result in excessive overhead and processing burdens on UEs and/or corresponding networks.

Some aspects of techniques and apparatuses described herein may facilitate sharing channel processing and/or communication resources by enabling a UE to report beam applicability information corresponding to one or more physical channels for a UE cooperation operation. For example, in some aspects, and as shown in FIG. 3, the UE 340 may transmit a beam applicability report 380 to a base station (e.g., TRP 310). The beam applicability report 380 may include beam applicability information that indicates an applicability of one or more beam indications to the one or more physical channels. The UE may communicate with at least one wireless communication device in the UE cooperation operation based at least in part on the beam applicability information. In this way, some aspects may provide information that the base station may use to enable sharing of resources between a UE panel and one or more cooperative panels. As a result, some aspects of the techniques and apparatuses described herein may reduce overhead and processing burdens on UEs and/or corresponding networks.

As indicated above, FIG. 3 is provided as an example. Other examples may differ from what is described with regard to FIG. 3.

Figure 4:
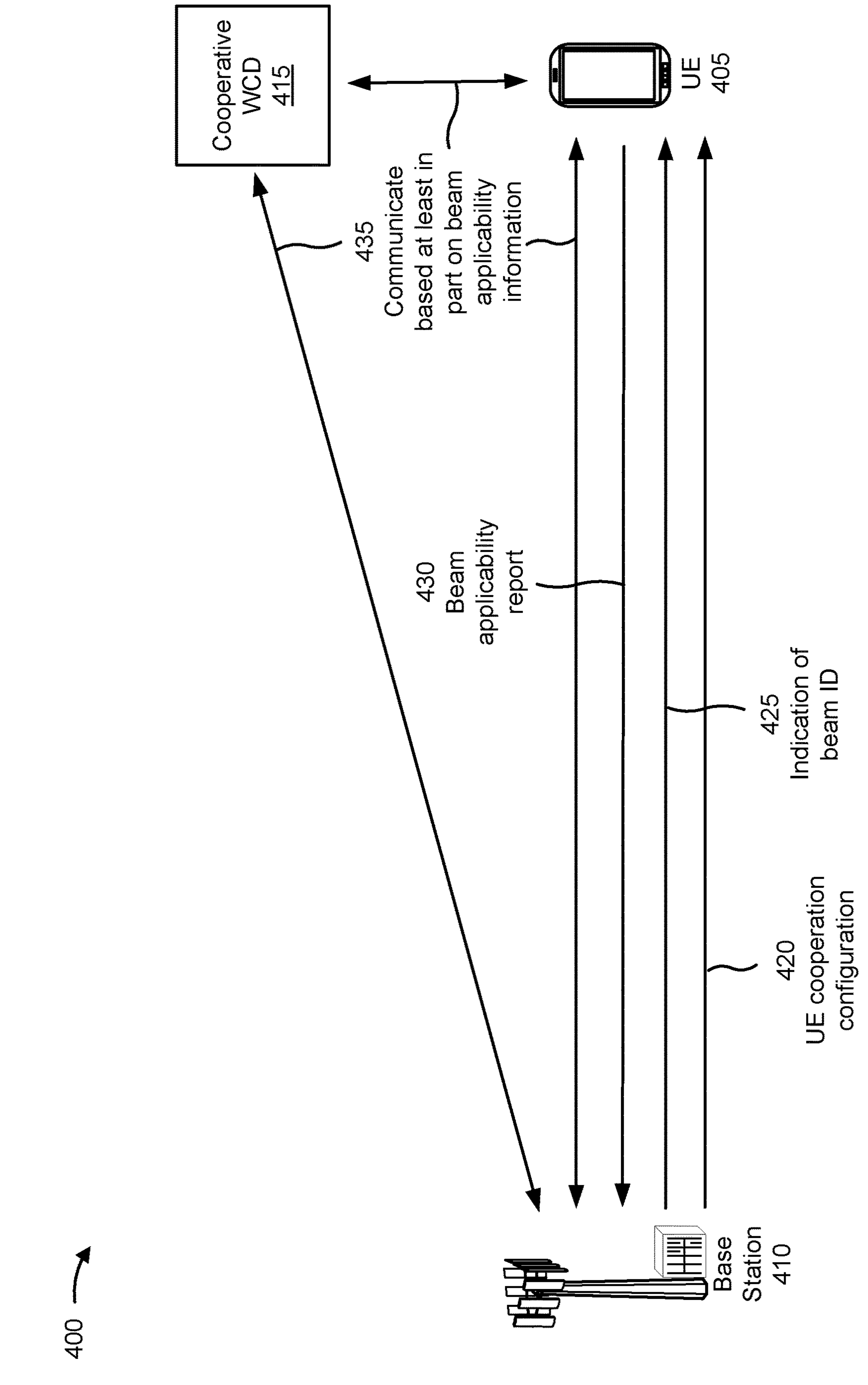
FIG. 4 is a diagram illustrating an example associated with indicating beam applicability for UE cooperation, in accordance with the present disclosure.

FIG. 4 is a diagram illustrating an example 400 of resource sharing in UE cooperation, in accordance with the present disclosure. As shown in FIG. 4, a UE 405, a base station 410, and a cooperative WCD 415 may communicate with one another. In some aspects, the base station 410 may include one or more TRPs (e.g., the TRP 310 and/or the TRP 335 shown in FIG. 3). In some aspects, the base station 410 may be associated with one of a first TRP or a second TRP, and an additional base station (not shown) may be associated with the other of the first TRP or the second TRP. The UE 405 may be, or be similar to, the UE 340 depicted in FIG. 3 and/or the UE 120 depicted in FIGS. 1 and 2. The cooperative WCD 415 may be, or be similar to, the cooperative WCD 355 and/or the cooperative WCD 365 shown in FIG. 3. In some aspects, one or more additional cooperative WCDs (not shown) may be associated with a UE cooperation operation corresponding to the UE 405.

As shown by reference number 420, the base station 410 may transmit, and the UE 405 may receive, a UE cooperation configuration. The UE cooperation configuration may indicate cooperation resources (e.g., sidelink resources, uplink resources, and/or downlink resources), panel configurations, and/or other parameters that may facilitate distributed panel sharing between the UE 405 and the cooperative WCD 415. In some aspects, the base station 410 may also transmit the UE cooperation configuration (or a portion thereof) to the cooperative WCD 415.

In some aspects, the UE cooperation configuration may indicate at least one list of beam indications corresponding to at least one physical channel. The at least one list of beam indications corresponding to the at least one physical channel may include, for example, one or more sets of downlink lists, one or more sets of uplink lists, and/or one or more sets of combined lists. In some aspects, a set of downlink lists may include at least one of a TCI list corresponding to a PDCCH, a TCI list corresponding to a PDSCH, or a TCI list corresponding to the PDCCH and the PDSCH. In some aspects, a set of uplink lists may include at least one of a TCI list corresponding to a physical uplink control channel (PUCCH), a TCI list corresponding to a PUSCH, or a TCI list corresponding to the PUCCH and the PUSCH. In some aspects, a set of combined lists may include at least one of a TCI list for downlink and uplink communications associated with a first panel, or a TCI list for downlink and uplink communications associated with a second panel.

In some aspects, the UE cooperation configuration may configure at least one CSI report corresponding to at least one physical channel. For example, the CSI report may be used in a dedicated manner for the at least one configured physical channel. In some aspects, the at least one CSI report may include at least one of a first CSI report corresponding to one or more beams applicable to PDCCH cooperative reception, a second CSI report corresponding to one or more beams applicable to PDSCH cooperative reception, or a third CSI report corresponding to one or more beams applicable to PDCCH and PDSCH cooperative reception.

As shown by reference number 425, the base station 410 may transmit, and the UE may receive, an indication of a beam identifier (ID). The base station 410 may include the beam ID in the UE cooperation configuration or in a separate communication.

As shown by reference number 430, the UE 405 may transmit, and the base station 410 may receive, a beam applicability report. The beam applicability report may indicate beam applicability information corresponding to one or more physical channels (e.g., a set of downlink channels, a set of uplink channels, and/or a set of downlink channels and uplink channels) for a UE cooperation operation. The set of downlink channels may include, for example, at least one of a PDCCH or a PDSCH. The set of uplink channels may include, for example, at least one of a PUCCH or a PUSCH.

In some aspects, the UE cooperation operation may include a single DCI based UE cooperation or a multiple DCI based UE cooperation. In some aspects, transmitting the beam applicability report may include transmitting at least one of an uplink control information (UCI) transmission or a MAC-CE that includes the beam applicability report. In some aspects, the UE 405 may transmit the beam applicability report by transmitting at least one of a UE capability based report or a UE assistance information report, which may be used for power saving procedures and/or mitigating overheating, among other examples.

In some aspects, the beam applicability information may include an indication of one or more physical channels applicable to a beam ID received from the base station. In some aspects, the beam applicability information may indicate an applicability of one or more beam indications to the one or more physical channels. The one or more beam indications may include at least one of a TCI state, spatial relation information, quasi co-location information, or a spatial filter. In some aspects, the beam applicability information may indicate at least one CSI-RS associated with the set of downlink channels and/or at least one sounding reference signal (SRS) associated with the set of uplink channels.

In some aspects, the beam applicability information may include an applicability indicator that indicates an applicability state. In some aspects, an applicability state may include at least one of a full cooperation state, a downlink cooperation state, an uplink cooperation state, a DCI cooperation state, or a UCI cooperation state. In a full cooperation state, the UE 405 cooperates on a set of physical channels, and a TCI may be applicable to each physical channel in the set of physical channels in cooperation. In a downlink cooperation state, the UE 405 may cooperate on a subset of downlink channels of the set of physical channels, and a TCI that is applicable to a first downlink channel of the subset of downlink channels may be applicable to a second downlink channel of the subset of downlink channels. For example, the first downlink channel of the subset of downlink channels and the second downlink channel of the subset of downlink channels may be associated with different panels of UE 405 or cooperative WCD 415. In an uplink cooperation state, the UE 405 may cooperate on a subset of uplink channels of the set of physical channels, and a TCI that is applicable to a first uplink channel of the subset of uplink channels may be applicable to a second uplink channel of the subset of uplink channels. For example, the first uplink channel of the subset of uplink channels and the second uplink channel of the subset of uplink channels may be associated with different panels of the UE 405 or the cooperative WCD 415. In a downlink control information cooperation state, the UE 405 may cooperate on a subset of PDCCHs of the set of physical channels and a TCI that is applicable to a first PDCCH of the subset of PDCCHs may be applicable to a second PDCCH of the subset of PDCCHs. For example, the first PDCCH channel of the subset of PDCCH channels and the second PDCCH channel of the subset of PDCCH channels may be associated with different panels of the UE 405 or the cooperative WCD 415. In an uplink control information cooperation state, the UE may cooperate on a subset of PUCCHs of the set of physical channels and a TCI that is applicable to a first PUCCH of the subset of PUCCHs may be applicable to a second PUCCH of the subset of PUCCHs. For example, the first PUCCH channel of the subset of PUCCH channels and the second PUCCH channel of the subset of PUCCH channels may be associated with different panels of the UE 405 or the cooperative WCD 415.

As shown by reference number 435, the UE 405 and the base station 410 may communicate based at least in part on the beam applicability information. As is further shown, the base station 410 and the cooperative WCD 415 may communicate based at least in part on the beam applicability information. In some aspects, the UE 405 and the cooperative WCD 415 may communicate based at least in part on the beam applicability information.

As indicated above, FIG. 4 is provided as an example. Other examples may differ from what is described with regard to FIG. 4.

Figure 5:
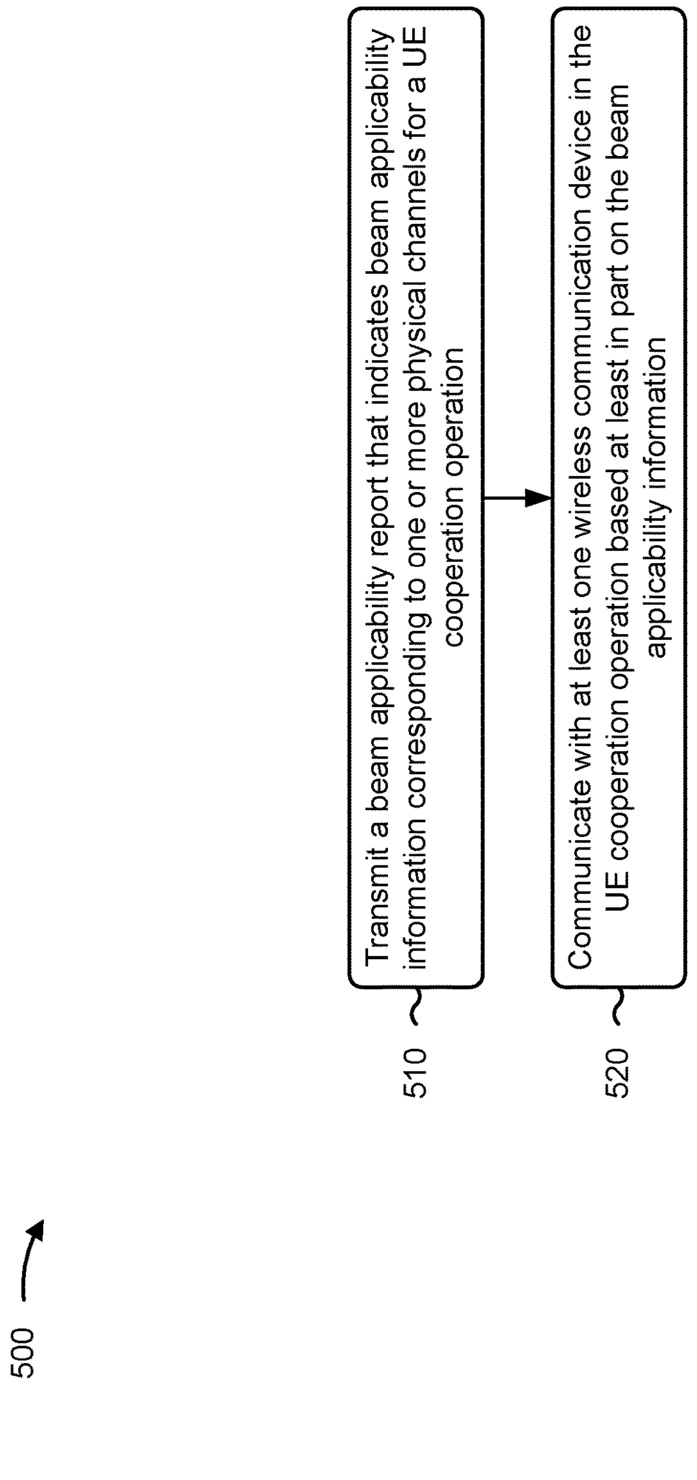
FIGS. 5 and 6 are diagrams illustrating example processes associated with indicating beam applicability for UE cooperation, in accordance with the present disclosure.

FIG. 5 is a diagram illustrating an example process 500 performed, for example, by a UE, in accordance with the present disclosure. Example process 500 is an example where the UE (e.g., UE 120, UE 340, and/or UE 405) performs operations associated with indicating beam applicability for UE cooperation.

As shown in FIG. 5, in some aspects, process 500 may include transmitting a beam applicability report that indicates beam applicability information corresponding to one or more physical channels for a UE cooperation operation (block 510). For example, the UE (e.g., using communication manager 708 and/or transmission component 704, depicted in FIG. 7) may transmit a beam applicability report that indicates beam applicability information corresponding to one or more physical channels for a UE cooperation operation, as described above.

As further shown in FIG. 5, in some aspects, process 500 may include communicating with at least one wireless communication device in the UE cooperation operation based at least in part on the beam applicability information (block 520). For example, the UE (e.g., using communication manager 708, reception component 702, and/or transmission component 704, depicted in FIG. 7) may communicate with at least one wireless communication device in the UE cooperation operation based at least in part on the beam applicability information, as described above.

Process 500 may include additional aspects, such as any single aspect or any combination of aspects described below and/or in connection with one or more other processes described elsewhere herein.

In a first aspect, the one or more physical channels comprise a set of downlink channels, a set of uplink channels, or a set of downlink channels and uplink channels.

In a second aspect, alone or in combination with the first aspect, the beam applicability information indicates an applicability of one or more beam indications to the one or more physical channels.

In a third aspect, alone or in combination with the second aspect, the one or more beam indications comprise at least one of a TCI state, spatial relation information, quasi co-location information, or a spatial filter.

In a fourth aspect, alone or in combination with one or more of the first through third aspects, the set of downlink channels comprises at least one of a PDCCH or a PDSCH.

In a fifth aspect, alone or in combination with the fourth aspect, the beam applicability information further indicates at least one CSI-RS associated with the set of downlink channels.

In a sixth aspect, alone or in combination with one or more of the first through fifth aspects, the set of uplink channels comprises at least one of a PUCCH or a PUSCH.

In a seventh aspect, alone or in combination with the sixth aspect, the beam applicability information further indicates at least one SRS associated with the set of uplink channels.

In an eighth aspect, alone or in combination with one or more of the first through seventh aspects, transmitting the beam applicability report comprises transmitting at least one of a UE capability based report or a UE assistant information report.

In a ninth aspect, alone or in combination with one or more of the first through eighth aspects, the beam applicability information may comprise an applicability indicator that indicates an applicability state, the applicability state comprising a full cooperation state in which the UE cooperates on a set of physical channels and in which a TCI is applicable to each physical channel in the set of physical channels, a downlink cooperation state in which the UE cooperates on a subset of downlink channels of the set of physical channels and wherein a TCI that is applicable to a first downlink channel of the subset of downlink channels is applicable to a second downlink channel of the subset of downlink channels, an uplink cooperation state in which the UE cooperates on a subset of uplink channels of the set of physical channels and wherein a TCI that is applicable to a first uplink channel of the subset of uplink channels is applicable to a second uplink channel of the subset of uplink channels, a downlink control information cooperation state in which the UE cooperates on a subset of PDCCHs of the set of physical channels and wherein a TCI that is applicable to a first PDCCH of the subset of PDCCHs is applicable to a second PDCCH of the subset of PDCCHs, or an uplink control information cooperation state in which the UE cooperates on a subset of PUCCHs of the set of physical channels and wherein a TCI that is applicable to a first PUCCH of the subset of PUCCHs is applicable to a second PUCCH of the subset of PUCCHs.

In a tenth aspect, alone or in combination with one or more of the first through ninth aspects, transmitting the beam applicability report comprises transmitting at least one of a UCI transmission or a MAC-CE.

In an eleventh aspect, alone or in combination with the tenth aspect, process 500 includes receiving an indication of a beam ID, wherein transmitting the at least one of the UCI transmission or the MAC-CE comprises transmitting an indication of the one or more physical channels applicable to the beam ID.

In a twelfth aspect, alone or in combination with one or more of the first through eleventh aspects, process 500 includes receiving a UE cooperation configuration that indicates at least one list of beam indications corresponding to at least one physical channel.

In a thirteenth aspect, alone or in combination with the twelfth aspect, the at least one list of beam indications corresponding to the at least one physical channel comprises at least one of: a set of downlink lists, wherein the set of downlink lists includes at least one of a TCI list corresponding to a PDCCH, a TCI list corresponding to a PDSCH, or a TCI list corresponding to the PDCCH and the PDSCH; a set of uplink lists, wherein the set of uplink lists includes at least one of a TCI list corresponding to a PUCCH, a TCI list corresponding to a PUSCH, or a TCI list corresponding to the PUCCH and the PUSCH: or a set of combined lists, wherein the set of combined lists includes at least one of a TCI list for downlink and uplink communications associated with a first panel, or a TCI list for downlink and uplink communications associated with a second panel.

In a fourteenth aspect, alone or in combination with one or more of the first through thirteenth aspects, the UE cooperation operation comprises a single DCI based UE cooperation or a multiple DCI based UE cooperation.

In a fifteenth aspect, alone or in combination with one or more of the first through fourteenth aspects, process 500 includes receiving a UE cooperation configuration that configures at least one CSI report corresponding to at least one physical channel.

In a sixteenth aspect, alone or in combination with the fifteenth aspect, the at least one CSI report comprises at least one of a first CSI report corresponding to one or more beams applicable to PDCCH cooperative reception, a second CSI report corresponding to one or more beams applicable to PDSCH cooperative reception, or a third CSI report corresponding to one or more beams applicable to PDCCH and PDSCH cooperative reception.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
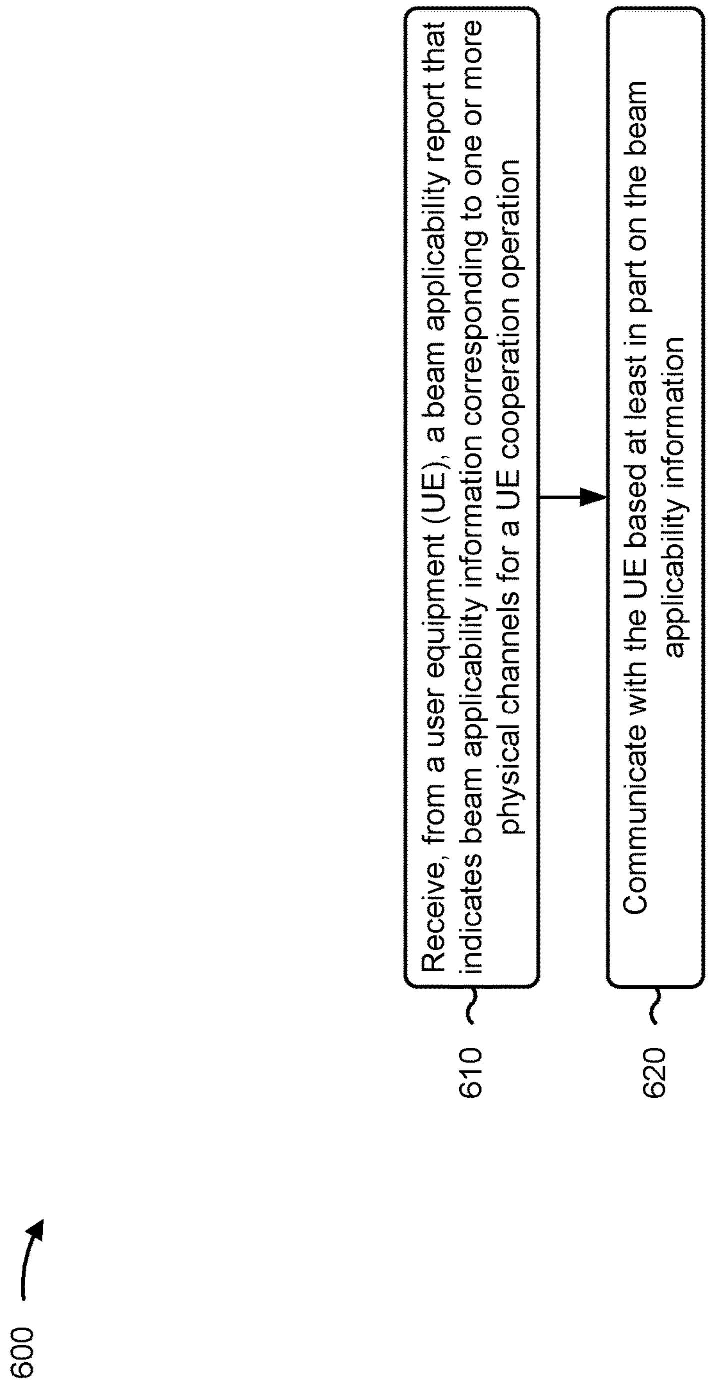

FIG. 6 is a diagram illustrating an example process 600 performed, for example, by a base station, in accordance with the present disclosure. Example process 600 is an example where the base station (e.g., base station 110 and/or base station 410) performs operations associated with indicating beam applicability for UE cooperation.

As shown in FIG. 6, in some aspects, process 600 may include receiving, from a UE, a beam applicability report that indicates beam applicability information corresponding to one or more physical channels for a UE cooperation operation (block 610). For example, the base station (e.g., using communication manager 808 and/or reception component 802, depicted in FIG. 8) may receive, from a UE, a beam applicability report that indicates beam applicability information corresponding to one or more physical channels for a UE cooperation operation, as described above.

As further shown in FIG. 6, in some aspects, process 600 may include communicating with the UE based at least in part on the beam applicability information (block 620). For example, the base station (e.g., using communication manager 808, reception component 802, and/or transmission component 804, depicted in FIG. 8) may communicate with the UE based at least in part on the beam applicability information, as described above.

Process 600 may include additional aspects, such as any single aspect or any combination of aspects described below and/or in connection with one or more other processes described elsewhere herein.

In a first aspect, the one or more physical channels comprise a set of downlink channels, a set of uplink channels, or a set of downlink channels and uplink channels.

In a second aspect, alone or in combination with the first aspect, the beam applicability information indicates an applicability of one or more beam indications to the one or more physical channels.

In a third aspect, alone or in combination with one or more of the first and second aspects, the one or more beam indications comprise at least one of a TCI state, spatial relation information, quasi co-location information, or a spatial filter.

In a fourth aspect, alone or in combination with one or more of the first through third aspects, the set of downlink channels comprises at least one of a PDCCH or a PDSCH.

In a fifth aspect, alone or in combination with one or more of the first through fourth aspects, process 600 includes transmitting an indication of a beam ID, wherein receiving the beam applicability report comprises receiving at least one of a UCI transmission or a MAC-CE, wherein the at least one of the UCI transmission or the MAC-CE includes an indication of the one or more physical channels applicable to the beam ID.

In a sixth aspect, alone or in combination with one or more of the first through fifth aspects, process 600 includes transmitting a UE cooperation configuration that indicates at least one list of beam indications corresponding to at least one physical channel.

In a seventh aspect, alone or in combination with the sixth aspect, the at least one list of beam indications corresponding to the at least one physical channel comprises at least one of: a set of downlink lists, wherein the set of downlink lists includes at least one of a TCI list corresponding to a PDCCH, a TCI list corresponding to a PDSCH, or a TCI list corresponding to the PDCCH and the PDSCH; a set of uplink lists, wherein the set of uplink lists includes at least one of a TCI list corresponding to a PUCCH, a TCI list corresponding to a PUSCH, or a TCI list corresponding to the PUCCH and the PUSCH; or a set of combined lists, wherein the set of combined lists includes at least one of a TCI list for downlink and uplink communications associated with a first panel, or a TCI list for downlink and uplink communications associated with a second panel.

In an eighth aspect, alone or in combination with one or more of the first through seventh aspects, the UE cooperation operation comprises a single DCI based UE cooperation or a multiple DCI based UE cooperation.

In a ninth aspect, alone or in combination with one or more of the first through eighth aspects, process 600 includes transmitting a UE cooperation configuration that configures at least one CSI report corresponding to at least one physical channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
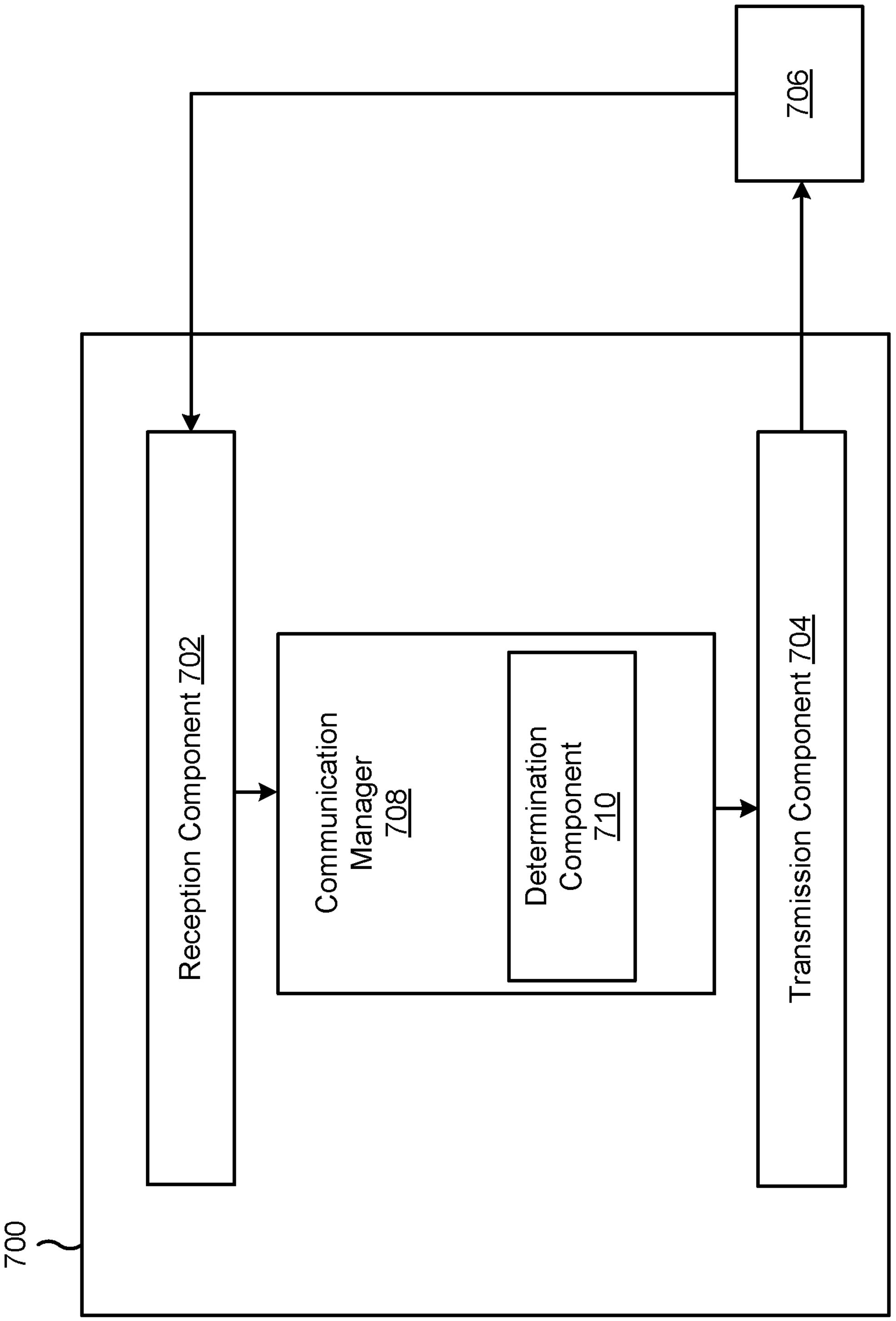
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 1100 may include a communication manager 708. The communication manager 708 may include a determination component 710.

In some aspects, the apparatus 700 may be configured to perform one or more operations described herein in connection with FIGS. 3 and 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The transmission component 704 may transmit a beam applicability report that indicates beam applicability information corresponding to one or more physical channels for a UE cooperation operation. The communication manager 708, the reception component 702, and/or the transmission component 704 may communicate with at least one wireless communication device in the UE cooperation operation based at least in part on the beam applicability information. In some aspects, the communication manager 708 may include one or more antennas, a modulator, a transmit MIMO processor, a transmit processor, a controller/processor, a memory, or a combination thereof, of the UE described above in connection with FIG. 2. In some aspects, the communication manager 708 may include the determination component 710, the reception component 702, and/or the transmission component 704.

The determination component 710 may determine beam applicability information corresponding to one or more physical channels for a UE cooperation operation. In some aspects, the determination component 710 may include one or more antennas, a modulator, a transmit MIMO processor, a transmit processor, a controller/processor, a memory, or a combination thereof, of the UE described above in connection with FIG. 2. In some aspects, the determination component 710 may include the communication manager 708, the reception component 702, and/or the transmission component 704.

The reception component 702 may receive an indication of a beam ID, wherein transmitting the at least one of the UCI transmission or the MAC-CE comprises transmitting an indication of the one or more physical channels applicable to the beam ID. The reception component 702 may receive a UE cooperation configuration that indicates at least one list of beam indications corresponding to at least one physical channel. The reception component 702 may receive a UE cooperation configuration that configures at least one CSI report corresponding to at least one physical channel.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
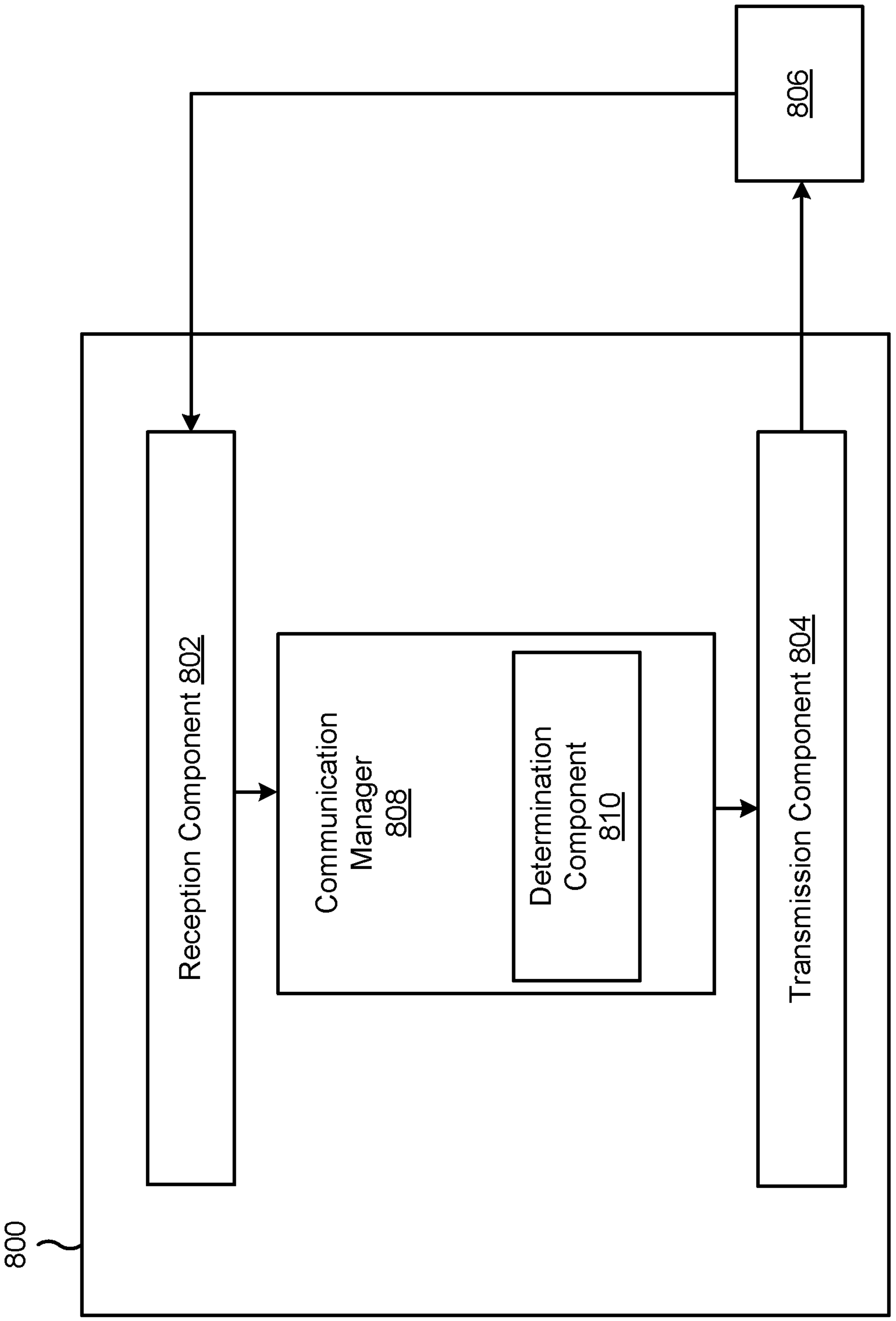

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 1100 may include a communication manager 808. The communication manager 808 may include a determination component 810.

In some aspects, the apparatus 800 may be configured to perform one or more operations described herein in connection with FIGS. 3 and 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The reception component 802 may receive, from a UE, a beam applicability report that indicates beam applicability information corresponding to one or more physical channels for a UE cooperation operation. The communication manager 808, the reception component 802, and/or the transmission component 804 may communicate with the UE based at least in part on the beam applicability information.

The transmission component 804 may transmit an indication of a beam ID, wherein receiving the beam applicability report comprises receiving at least one of a UCI transmission or a MAC-CE, wherein the at least one of the UCI transmission or the MAC-CE includes an indication of the one or more physical channels applicable to the beam ID.

The transmission component 804 may transmit a UE cooperation configuration that indicates at least one list of beam indications corresponding to at least one physical channel. The transmission component 804 may transmit a UE cooperation configuration that configures at least one CSI report corresponding to at least one physical channel.

The communication manager 808, the reception component 802, and/or the transmission component 804 may communicate with at least one wireless communication device in the UE cooperation operation based at least in part on the beam applicability information. In some aspects, the communication manager 808 may include one or more antennas, a modulator, a transmit MIMO processor, a transmit processor, a controller/processor, a memory, or a combination thereof, of the base station described above in connection with FIG. 2. In some aspects, the communication manager 808 may include the determination component 810, the reception component 802 and/or the transmission component 804.

The determination component 810 may determine a beam configuration for a UE cooperation operation. In some aspects, the determination component 810 may include one or more antennas, a modulator, a transmit MIMO processor, a transmit processor, a controller/processor, a memory, or a combination thereof, of the base station described above in connection with FIG. 2. In some aspects, the determination component 810 may include the communication manager 808, the reception component 802, and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting a beam applicability report that indicates beam applicability information corresponding to one or more physical channels for a UE cooperation operation; and communicating with at least one wireless communication device in the UE cooperation operation based at least in part on the beam applicability information.

Aspect 2: The method of Aspect 1, wherein the one or more physical channels comprise: a set of downlink channels, a set of uplink channels, or a set of downlink channels and uplink channels.

Aspect 3: The method of Aspect 2, wherein the beam applicability information indicates an applicability of one or more beam indications to the one or more physical channels.

Aspect 4: The method of Aspect 3, wherein the one or more beam indications comprise at least one of: a transmission configuration indicator (TCI) state, spatial relation information, quasi co-location information, or a spatial filter.

Aspect 5: The method of any of Aspects 2-4, wherein the set of downlink channels comprises at least one of a physical downlink control channel (PDCCH) or a physical downlink shared channel (PDSCH).

Aspect 6: The method of Aspect 5, wherein the beam applicability information further indicates at least one channel state information reference signal (CSI-RS) associated with the set of downlink channels.

Aspect 7: The method of any of Aspects 2-6, wherein the set of uplink channels comprises at least one of a physical uplink control channel (PUCCH) or a physical uplink shared channel (PUSCH).

Aspect 8: The method of Aspect 7, wherein the beam applicability information further indicates at least one sounding reference signal (SRS) associated with the set of uplink channels.

Aspect 9: The method of any of Aspects 1-8, wherein transmitting the beam applicability report comprises transmitting at least one of a UE capability based report or a UE assistant information report.

Aspect 10: The method of any of Aspects 1-9, wherein the beam applicability information may comprise an applicability indicator that indicates an applicability state, the applicability state comprising: a full cooperation state in which the UE cooperates on a set of physical channels and in which a transmission configuration indicator (TCI) is applicable to each physical channel in the set of physical channels, a downlink cooperation state in which the UE cooperates on a subset of downlink channels of the set of physical channels and wherein a TCI that is applicable to a first downlink channel of the subset of downlink channels is applicable to a second downlink channel of the subset of downlink channels, an uplink cooperation state in which the UE cooperates on a subset of uplink channels of the set of physical channels and wherein a TCI that is applicable to a first uplink channel of the subset of uplink channels is applicable to a second uplink channel of the subset of uplink channels, a downlink control information cooperation state in which the UE cooperates on a subset of physical downlink control channels (PDCCHs) of the set of physical channels and wherein a TCI that is applicable to a first PDCCH of the subset of PDCCHs is applicable to a second PDCCH of the subset of PDCCHs, or an uplink control information cooperation state in which the UE cooperates on a subset of physical uplink control channels (PUCCHs) of the set of physical channels and wherein a TCI that is applicable to a first PUCCH of the subset of PUCCHs is applicable to a second PUCCH of the subset of PUCCHs.

Aspect 11: The method of any of Aspects 1-10, wherein transmitting the beam applicability report comprises transmitting at least one of an uplink control information (UCI) transmission or a medium access control element (MAC-CE).

Aspect 12: The method of Aspect 11, further comprising receiving an indication of a beam identifier (ID), wherein transmitting the at least one of the UCI transmission or the MAC-CE comprises transmitting an indication of the one or more physical channels applicable to the beam ID.

Aspect 13: The method of any of Aspects 1-12, further comprising receiving a UE cooperation configuration that indicates at least one list of beam indications corresponding to at least one physical channel.

Aspect 14: The method of Aspect 13, wherein the at least one list of beam indications corresponding to the at least one physical channel comprises at least one of: a set of downlink lists, wherein the set of downlink lists includes at least one of a transmission configuration indicator (TCI) list corresponding to a physical downlink control channel (PDCCH), a TCI list corresponding to a physical downlink shared channel (PDSCH), or a TCI list corresponding to the PDCCH and the PDSCH, a set of uplink lists, wherein the set of uplink lists includes at least one of a TCI list corresponding to a physical uplink control channel (PUCCH), a TCI list corresponding to a physical uplink shared channel (PUSCH), or a TCI list corresponding to the PUCCH and the PUSCH, or a set of combined lists, wherein the set of combined lists includes at least one of a TCI list for downlink and uplink communications associated with a first panel, or a TCI list for downlink and uplink communications associated with a second panel.

Aspect 15: The method of any of Aspects 1-14, wherein the UE cooperation operation comprises a single downlink control information (DCI) based UE cooperation or a multiple DCI based UE cooperation.

Aspect 16: The method of any of Aspects 1-15, further comprising receiving a UE cooperation configuration that configures at least one channel state information (CSI) report corresponding to at least one physical channel.

Aspect 17: The method of Aspect 16, wherein the at least one CSI report comprises at least one of: a first CSI report corresponding to one or more beams applicable to physical downlink control channel (PDCCH) cooperative reception, a second CSI report corresponding to one or more beams applicable to physical downlink shared channel (PDSCH) cooperative reception, or a third CSI report corresponding to one or more beams applicable to PDCCH and PDSCH cooperative reception.

Aspect 18: A method of wireless communication performed by a base station, comprising: receiving, from a user equipment (UE), a beam applicability report that indicates beam applicability information corresponding to one or more physical channels for a UE cooperation operation; and communicating with the UE based at least in part on the beam applicability information.

Aspect 19: The method of Aspect 18, wherein the one or more physical channels comprise: a set of downlink channels, a set of uplink channels, or a set of downlink channels and uplink channels.

Aspect 20: The method of Aspect 19, wherein the beam applicability information indicates an applicability of one or more beam indications to the one or more physical channels.

Aspect 21: The method of Aspect 20, wherein the one or more beam indications comprise at least one of: a transmission configuration indicator (TCI) state, spatial relation information, quasi co-location information, or a spatial filter.

Aspect 22: The method of any of Aspects 19-21, wherein the set of downlink channels comprises at least one of a physical downlink control channel (PDCCH) or a physical downlink shared channel (PDSCH).

Aspect 23: The method of any of Aspects 18-22, further comprising transmitting an indication of a beam identifier (ID), wherein receiving the beam applicability report comprises receiving at least one of an uplink control information (UCI) transmission or a medium access control element (MAC-CE), wherein the at least one of the UCI transmission or the MAC-CE includes an indication of the one or more physical channels applicable to the beam ID.

Aspect 24: The method of any of Aspects 18-23, further comprising transmitting a UE cooperation configuration that indicates at least one list of beam indications corresponding to at least one physical channel.

Aspect 25: The method of Aspect 24, wherein the at least one list of beam indications corresponding to the at least one physical channel comprises at least one of: a set of downlink lists, wherein the set of downlink lists includes at least one of a transmission configuration indicator (TCI) list corresponding to a physical downlink control channel (PDCCH), a TCI list corresponding to a physical downlink shared channel (PDSCH), or a TCI list corresponding to the PDCCH and the PDSCH, a set of uplink lists, wherein the set of uplink lists includes at least one of a TCI list corresponding to a physical uplink control channel (PUCCH), a TCI list corresponding to a physical uplink shared channel (PUSCH), or a TCI list corresponding to the PUCCH and the PUSCH, or a set of combined lists, wherein the set of combined lists includes at least one of a TCI list for downlink and uplink communications associated with a first panel, or a TCI list for downlink and uplink communications associated with a second panel.

Aspect 26: The method of any of Aspects 18-25, wherein the UE cooperation operation comprises a single downlink control information (DCI) based UE cooperation or a multiple DCI based UE cooperation.

Aspect 27: The method of any of Aspects 18-26, further comprising transmitting a UE cooperation configuration that configures at least one channel state information (CSI) report corresponding to at least one physical channel.

Aspect 28: The method of Aspect 27, wherein the at least one CSI report comprises at least one of: a first CSI report corresponding to one or more beams applicable to physical downlink control channel (PDCCH) cooperative reception, a second CSI report corresponding to one or more beams applicable to physical downlink shared channel (PDSCH) cooperative reception, or a third CSI report corresponding to one or more beams applicable to PDCCH and PDSCH cooperative reception.

Aspect 29: An apparatus for wireless communication at a device, comprising a processor; memory coupled with the processor; and instructions stored in the memory and executable by the processor to cause the apparatus to perform the method of one or more Aspects of Aspects 1-17.

Aspect 30: A device for wireless communication, comprising a memory and one or more processors coupled to the memory, the memory and the one or more processors configured to perform the method of one or more Aspects of Aspects 1-17.

Aspect 31: An apparatus for wireless communication, comprising at least one means for performing the method of one or more Aspects of Aspects 1-17.

Aspect 32: A non-transitory computer-readable medium storing code for wireless communication, the code comprising instructions executable by a processor to perform the method of one or more Aspects of Aspects 1-17.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 34: An apparatus for wireless communication at a device, comprising a processor; memory coupled with the processor; and instructions stored in the memory and executable by the processor to cause the apparatus to perform the method of one or more Aspects of Aspects 18-28.

Aspect 35: A device for wireless communication, comprising a memory and one or more processors coupled to the memory, the memory and the one or more processors configured to perform the method of one or more Aspects of Aspects 18-28.

Aspect 36: An apparatus for wireless communication, comprising at least one means for performing the method of one or more Aspects of Aspects 18-28.

Aspect 37: A non-transitory computer-readable medium storing code for wireless communication, the code comprising instructions executable by a processor to perform the method of one or more Aspects of Aspects 18-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 18-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- memory; and
- one or more processors, coupled to the memory, configured to:
  - receive, from a base station, UE cooperation configuration information that indicates at least one list of beam indications corresponding to at least one physical channel of one or more physical channels for distributed panel sharing between the UE and at least one wireless communication device;
  - transmit, to the base station, a beam applicability report that indicates beam applicability information, wherein the beam applicability information indicates an applicability of the at least one list of beam indications to the at least on physical channel of the one or more physical channels, and wherein the beam applicability information indicates a cooperation state for the distributed panel sharing associated with the one or more physical channels; and
  - communicate with the at least one wireless communication device based at least in part on the beam applicability information.

2. The UE of claim 1, wherein the one or more physical channels comprise:
- a set of downlink channels,
- a set of uplink channels, or
- a set of downlink channels and uplink channels.

3. The UE of claim 2, wherein the set of downlink channels comprises at least one of a physical downlink control channel (PDCCH) or a physical downlink shared channel (PDSCH).

4. The UE of claim 3, wherein the beam applicability information further indicates at least one channel state information reference signal (CSI-RS) associated with the set of downlink channels.

5. The UE of claim 2, wherein the set of uplink channels comprises at least one of a physical uplink control channel (PUCCH) or a physical uplink shared channel (PUSCH).

6. The UE of claim 5, wherein the beam applicability information further indicates at least one sounding reference signal (SRS) associated with the set of uplink channels.

7. The UE of claim 1, wherein the one or more beam indications comprise at least one of:
- a transmission configuration indicator (TCI) state,
- spatial relation information,
- quasi co-location information, or
- a spatial filter.

8. The UE of claim 1, wherein the one or more processors, to transmit the beam applicability report, are configured to transmit at least one of a UE capability based report or a UE assistant information report.

9. The UE of claim 1, wherein the beam applicability information comprises an applicability indicator that indicates an applicability state, the applicability state comprising:
- a full cooperation state in which the UE cooperates on a set of physical channels and in which a transmission configuration indicator (TCI) is applicable to each physical channel in the set of physical channels, a downlink cooperation state in which the UE cooperates on a subset of downlink channels of the set of physical channels and wherein a TCI that is applicable to a first downlink channel of the subset of downlink channels is applicable to a second downlink channel of the subset of downlink channels, an uplink cooperation state in which the UE cooperates on a subset of uplink channels of the set of physical channels and wherein a TCI that is applicable to a first uplink channel of the subset of uplink channels is applicable to a second uplink channel of the subset of uplink channels, a downlink control information cooperation state in which the UE cooperates on a subset of physical downlink control channels (PDCCHs) of the set of physical channels and wherein a TCI that is applicable to a first PDCCH of the subset of PDCCHs is applicable to a second PDCCH of the subset of PDCCHs, or an uplink control information cooperation state in which the UE cooperates on a subset of physical uplink control channels (PUCCHs) of the set of physical channels and wherein a TCI that is applicable to a first PUCCH of the subset of PUCCHs is applicable to a second PUCCH of the subset of PUCCHs.

10. The UE of claim 1, wherein the one or more processors, to transmit the beam applicability report, are configured to transmit at least one of an uplink control information (UCI) transmission or a medium access control control element (MAC-CE).

11. The UE of claim 10, wherein the one or more processors are further configured to receive an indication of a beam identifier (ID), wherein transmitting the at least one of the UCI transmission or the MAC-CE comprises transmitting an indication of the one or more physical channels applicable to the beam ID.

12. The UE of claim 1, wherein the at least one list of beam indications corresponding to the at least one physical channel comprises at least one of:

a set of downlink lists, wherein the set of downlink lists includes at least one of a transmission configuration indicator (TCI) list corresponding to a physical downlink control channel (PDCCH), a TCI list corresponding to a physical downlink shared channel (PDSCH), or a TCI list corresponding to the PDCCH and the PDSCH, a set of uplink lists, wherein the set of uplink lists includes at least one of a TCI list corresponding to a physical uplink control channel (PUCCH), a TCI list corresponding to a physical uplink shared channel (PUSCH), or a TCI list corresponding to the PUCCH and the PUSCH, or a set of combined lists, wherein the set of combined lists includes at least one of a TCI list for downlink and uplink communications associated with a first panel, or a TCI list for downlink and uplink communications associated with a second panel.

13. The UE of claim 1, wherein the distributed panel sharing comprises a single downlink control information (DCI) based UE cooperation or a multiple DCI based UE cooperation.

14. The UE of claim 1, the UE cooperation configuration configures at least one channel state information (CSI) report corresponding to at least one physical channel.

15. The UE of claim 14, wherein the at least one CSI report comprises at least one of:

a first CSI report corresponding to one or more beams applicable to physical downlink control channel (PDCCH) cooperative reception, a second CSI report corresponding to one or more beams applicable to physical downlink shared channel (PDSCH) cooperative reception, or a third CSI report corresponding to one or more beams applicable to PDCCH and PDSCH cooperative reception.

16. A base station for wireless communication, comprising:

memory; and one or more processors, coupled to the memory, configured to:

transmit, to a user equipment (UE), UE cooperation configuration information that indicates at least one list of beam indications corresponding to at least one physical channel of one or more physical channels for distributed panel sharing between the UE and at least one wireless communication device;

receive, from the UE, a beam applicability report that indicates beam applicability information, wherein the beam applicability information indicates an applicability of the at least one list of beam indications to the at least on physical channel of the one or more physical channels, and wherein the beam applicability information indicates a cooperation state for the distributed panel sharing associated with the one or more physical channels; and communicate with the UE based at least in part on the beam applicability information.

17. The base station of claim 16, wherein the one or more physical channels comprise:

a set of downlink channels, a set of uplink channels, or a set of downlink channels and uplink channels.

18. The base station of claim 17, wherein the set of downlink channels comprises at least one of a physical downlink control channel (PDCCH) or a physical downlink shared channel (PDSCH).

19. The base station of claim 16, wherein the one or more beam indications comprise at least one of:

a transmission configuration indicator (TCI) state, spatial relation information, quasi co-location information, or a spatial filter.

20. The base station of claim 16, wherein the one or more processors are further configured to transmit an indication of a beam identifier (ID), wherein receiving the beam applicability report comprises receiving at least one of an uplink control information (UCI) transmission or a medium access control control element (MAC-CE), wherein the at least one of the UCI transmission or the MAC-CE includes an indication of the one or more physical channels applicable to the beam ID.

21. The base station of claim 16, wherein the at least one list of beam indications corresponding to the at least one physical channel comprises at least one of:

a set of downlink lists, wherein the set of downlink lists includes at least one of a transmission configuration indicator (TCI) list corresponding to a physical downlink control channel (PDCCH), a TCI list corresponding to a physical downlink shared channel (PDSCH), or a TCI list corresponding to the PDCCH and the PDSCH, a set of uplink lists, wherein the set of uplink lists includes at least one of a TCI list corresponding to a physical uplink control channel (PUCCH), a TCI list corresponding to a physical uplink shared channel (PUSCH), or a TCI list corresponding to the PUCCH and the PUSCH, or a set of combined lists, wherein the set of combined lists includes at least one of a TCI list for downlink and uplink communications associated with a first panel, or a TCI list for downlink and uplink communications associated with a second panel.

22. The base station of claim 16, wherein the distributed panel sharing comprises a single downlink control information (DCI) based UE cooperation or a multiple DCI based UE cooperation.

23. The base station of claim 16, wherein the UE cooperation configuration configures at least one channel state information (CSI) report corresponding to at least one physical channel.

24. The base station of claim 23, wherein the at least one CSI report comprises at least one of:

a first CSI report corresponding to one or more beams applicable to physical downlink control channel (PDCCH) cooperative reception, a second CSI report corresponding to one or more beams applicable to physical downlink shared channel (PDSCH) cooperative reception, or a third CSI report corresponding to one or more beams applicable to PDCCH and PDSCH cooperative reception.

25. A method of wireless communication performed by a user equipment (UE), comprising:

receiving, from a base station, UE cooperation configuration information that indicates at least one list of beam indications corresponding to at least one physical channel of one or more physical channels for distributed panel sharing between the UE and at least one wireless communication device;

transmitting, to the base station, a beam applicability report that indicates beam applicability information, wherein the beam applicability information indicates an applicability of the at least one list of beam indications to the at least on physical channel of the one or more physical channels, and wherein the beam applicability information indicates a cooperation state for the distributed panel sharing associated with the one or more physical channels; and communicating with the at least one wireless communication device based at least in part on the beam applicability information.

26. The method of claim 25, wherein the one or more physical channels comprise:

a set of downlink channels, a set of uplink channels, or a set of downlink channels and uplink channels.

27. The method of claim 25, wherein the one or more beam indications comprise at least one of:

a transmission configuration indicator (TCI) state, spatial relation information, quasi co-location information, or a spatial filter.

28. A method of wireless communication performed by a base station, comprising:

transmitting, to a user equipment (UE), UE cooperation configuration information that indicates at least one list of beam indications corresponding to at least one physical channel of one or more physical channels for distributed panel sharing between the UE and at least one wireless communication device;

receiving, from the UE, a beam applicability report that indicates beam applicability information, wherein the beam applicability information indicates an applicability of the at least one list of beam indications to the at least on physical channel of the one or more physical channels, and wherein the beam applicability information indicates a cooperation state for the distributed panel sharing associated with the one or more physical channels; and communicating with the UE based at least in part on the beam applicability information.

29. The method of claim 28, wherein the one or more physical channels comprise:

a set of downlink channels, a set of uplink channels, or a set of downlink channels and uplink channels.

30. The method of claim 28, wherein the one or more beam indications comprise at least one of:

a transmission configuration indicator (TCI) state, spatial relation information, quasi co-location information, or a spatial filter.

* * * * *